(12) United States Patent
Watanabe

(10) Patent No.: US 8,382,063 B2
(45) Date of Patent: Feb. 26, 2013

(54) ELECTROMAGNETIC VALVE

(75) Inventor: Noritaka Watanabe, Okazaki (JP)

(73) Assignee: Toyooki Kogyo Co., Ltd (JP)

( * ) Notice: Subject to any disclaimer, the term of this patent is extended or adjusted under 35 U.S.C. 154(b) by 282 days.

(21) Appl. No.: 12/747,328

(22) PCT Filed: Dec. 10, 2008

(86) PCT No.: PCT/JP2008/072422
§ 371 (c)(1),
(2), (4) Date: Jun. 10, 2010

(87) PCT Pub. No.: WO2009/078321
PCT Pub. Date: Jun. 25, 2009

(65) Prior Publication Data
US 2010/0258753 A1    Oct. 14, 2010

(30) Foreign Application Priority Data

Dec. 14, 2007    (JP) .................................. 2007-323162

(51) Int. Cl.
*F16K 31/02*    (2006.01)
(52) U.S. Cl. ......... 251/129.15; 251/129.21; 251/129.02; 251/30.03; 251/30.04; 137/315.03; 335/277; 335/296
(58) Field of Classification Search ............. 251/129.15, 251/129.21, 129.02, 30.04, 30.03; 137/315.03; 335/277, 296, 297, 298
See application file for complete search history.

(56) References Cited

U.S. PATENT DOCUMENTS

| 2,458,123 A | * | 1/1949 | Wasserlein .................... 335/245 |
| 4,540,154 A | * | 9/1985 | Kolchinsky et al. ...... 251/129.15 |
| 5,160,116 A | * | 11/1992 | Sugiura et al. ........... 251/129.14 |
| 5,538,026 A | * | 7/1996 | Kazi ................................ 137/1 |

(Continued)

FOREIGN PATENT DOCUMENTS

| JP | 2001146974 A | * | 5/2001 |
| JP | 2005282837 A | * | 10/2005 |

OTHER PUBLICATIONS

English Translation of International Preliminary Report on Patentability from corresponding PCT Application No. PCT/JP2008/072422 dated Jul. 29, 2010.

*Primary Examiner* — John K Fristoe, Jr.
*Assistant Examiner* — Minh Le
(74) *Attorney, Agent, or Firm* — Grossman Tucker Perreault & Pfleger PLLC

(57) ABSTRACT

An electromagnetic valve includes a valve body, a valve element, a movable iron core, a guide tube, a coil, a yoke, and a fixed iron core. The valve body includes a fluid flow path. The valve element is movable and seated on a valve seat provided in the fluid flow path of the valve body. The movable iron core moves the valve element with respect to the valve seat. The guide tube is cylindrical and movably supports the movable iron core. The coil is mounted on an outer periphery of the guide tube. The yoke covers an outside of the coil and forms a magnetic circuit. The fixed iron core is provided facing the movable iron core and attracts the movable iron core by energization of the coil. The valve body is coupled to the guide tube on one opening end side of the guide tube, and the fixed iron core is provided on an other end side of the guide tube with a clearance spaced from an inside of the guide tube. One end of the yoke is coupled to the fixed iron core, and the valve body is coupled to an other end of the yoke.

5 Claims, 2 Drawing Sheets

U.S. PATENT DOCUMENTS

| | | | |
|---|---|---|---|
| 6,557,821 B2* | 5/2003 | Girouard et al. | 251/30.03 |
| 7,150,196 B2* | 12/2006 | Segawa et al. | 73/722 |
| 7,198,249 B2* | 4/2007 | Nakayasu | 251/30.04 |
| 7,401,762 B2* | 7/2008 | Ohmori et al. | 251/282 |
| 7,503,543 B2* | 3/2009 | Nomichi et al. | 251/129.15 |
| 8,028,970 B2* | 10/2011 | Fukano et al. | 251/129.15 |
| 8,151,819 B2* | 4/2012 | Suzuki et al. | 137/315.03 |
| 2002/0062866 A1* | 5/2002 | Sumiya et al. | 137/315.03 |
| 2004/0188651 A1* | 9/2004 | Okada et al. | 251/129.15 |
| 2007/0090317 A1* | 4/2007 | Kamiya et al. | 251/129.15 |
| 2007/0194261 A1* | 8/2007 | Kato et al. | 251/129.15 |
| 2008/0042086 A1* | 2/2008 | Sisk et al. | 251/129.02 |
| 2009/0072174 A1* | 3/2009 | Makino | 251/129.15 |
| 2009/0236551 A1* | 9/2009 | Nomichi et al. | 251/129.15 |

* cited by examiner

ELECTROMAGNETIC VALVE

TECHNICAL FIELD

The present invention relates to an electromagnetic valve that controls fluid, in which a movable iron core is attracted to a fixed iron core by energization of a coil and a valve element is moved by the movable iron core. The present invention particularly relates to an electromagnetic valve that is equipped in a fuel cell car to control supply of high-pressure gas from a gas tank filled with high-pressure hydrogen gas.

BACKGROUND ART

Heretofore, an electromagnetic valve is provided in a gas tank mounted in a fuel cell car, for example, and filled with high-pressure gas. The high-pressure gas is supplied from the gas tank by opening/closing control of the electromagnetic valve. As an example of such an electromagnetic valve, Patent Document 1 proposes an electromagnetic valve configured such that an end side of a cylindrical member is fixed to a fixed iron core by welding, and a movable iron core is movably inserted into the cylindrical member. A coil is mounted on an outer periphery of the cylindrical member, and the movable iron core is moved inside the cylindrical member by energization of the coil. The movable iron core is attracted to the fixed iron core to control supply of high-pressure gas.

As in Patent Document 2, an alternative electromagnetic valve is proposed, in which a cylindrical member is used and a movable iron core is movably inserted into the cylindrical member. One end side of the cylindrical member is secured to a valve body, and a fixed iron core is inserted from an other end side of the cylindrical member. An electromagnetic coil and a yoke are mounted on an outer periphery side of the cylindrical member, and the fixed iron core, the electromagnetic coil, the yoke, and the like are supported on the valve body via the cylindrical member.

Patent Document 1: Japanese Unexamined Patent Publication No. 2006-43746
Patent Document 2: Japanese Unexamined Patent Publication No. 2001-32955

DISCLOSURE OF THE INVENTION

Problems to be Solved by the Invention

In such conventional electromagnetic valves, the movable iron core is movably inserted into the thin-walled cylindrical member, and the one end side of the cylindrical member is secured to the fixed iron core by welding. Further, the yoke that covers the coil and forms a magnetic circuit is coupled to the fixed iron core with a bolt, and the other end of the cylindrical member is coupled to the valve body and the like. In this way, members such as the yoke, the fixed iron core, and the like, which form the magnetic circuit, are supported by the thin-walled cylindrical member. Moreover, in Patent Document 2, the valve body side and the electromagnetic coil side are combined by means of a narrow neck-shaped cylindrical member. Therefore, when strong external impact is applied to the yoke and the like through the gas tank at the time of collision or the like of a car, weight load of the yoke, the fixed iron core, and the like acts on the thin-walled cylindrical member. As a result, the yoke, the fixed iron core, and the like are heavily vibrated, and the welded portion between the cylindrical member and the fixed iron core may be ruptured or the cylindrical member itself may be ruptured at the narrow neck-shaped portion thereof. The conventional electromagnetic valves have such problems.

One object of the present invention is to provide an electromagnetic valve with increased impact resistance by improving support rigidity of the cylindrical member for the yoke, the fixed iron core, and the like, and thereby inhibiting the cylindrical member from being damaged by the external impact.

Means for Solving the Problems

In order to attain the above object, the present invention has taken the following measures to solve the problems.

In a first aspect of the present invention, an electromagnetic valve includes a valve body, a valve element, a movable iron core, a guide tube, a coil, a yoke, and a fixed iron core. The valve body includes a fluid flow path. The valve element is movable and seated on a valve seat provided in the fluid flow path of the valve body. The movable iron core moves the valve element with respect to the valve seat. The guide tube is cylindrical and movably supports the movable iron core. The coil is mounted on an outer periphery of the guide tube. The yoke covers an outside of the coil and forms a magnetic circuit. The fixed iron core is provided facing the movable iron core and attracts the movable iron core by energization of the coil. The valve body is coupled to the guide tube on one opening end side of the guide tube, and the fixed iron core is provided on an other end side of the guide tube with a clearance spaced from an inside of the guide tube. One end of the yoke is coupled to the fixed iron core, and the valve body is coupled to an other end of the yoke.

The above-described electromagnetic valve is attached to an attachment portion of a member to which the electromagnetic valve is to be attached, and the electromagnetic valve may include an abutment portion that abuts against the attachment portion. In such a case, the valve body includes a protruding portion that is cylindrical and provided in a protruding manner from the valve body. The protruding portion includes the fluid flow path formed therethrough in an axial direction thereof. The abutment portion is formed in such a manner as to have a contact surface extending in a direction perpendicular to the axial direction of the protruding portion.

In a second aspect of the present invention, an electromagnetic valve is for use in a gas tank, and includes a valve body, a valve element, a movable iron core, a guide tube, a coil, a yoke, and a fixed iron core. The valve body includes a gas flow path. The valve element is movable and seated on a valve seat provided in the gas flow path. The movable iron core moves the valve element with respect to the valve seat. The guide tube is cylindrical and movably supports the movable iron core. The coil is mounted on an outer periphery of the guide tube. The yoke covers an outside of the coil and forms a magnetic circuit. The fixed iron core attracts the movable iron core by energization of the coil. The valve body is coupled to the guide tube on one opening end side of the guide tube, and the fixed iron core is provided on an other end side of the guide tube. The fixed iron core is coupled to one end of the yoke, and the valve body is coupled to an other end of the yoke. The valve body includes a protruding portion that is cylindrical and provided in a protruding manner from the valve body. The protruding portion includes the gas flow path formed therethrough in an axial direction thereof. The valve body includes an abutment portion that has a contact surface extending in a direction perpendicular to the axial direction of the protruding portion. The abutment portion abuts against an attachment portion used to attach the electromagnetic valve to the gas tank.

In the above-described first and second aspects, the valve body includes a first valve body member made of austenitic stainless steel and a second valve body member made of magnetic material. The first valve body member includes the protruding portion and the abutment portion, and is coupled to the yoke. The second valve body member may be configured to form a part of the magnetic circuit.

Effect of the Invention

The electromagnetic valve of the present invention is configured such that the one opening end side of the cylindrical guide tube, into which the movable iron core is movably inserted, is coupled to the valve body, and the fixed iron core is inserted from the other opening end side of the guide tube with a clearance spaced from the inside of the guide tube. The movable iron core and the fixed iron core are thus faced with each other. Further, the fixed iron core is coupled to the yoke, and the yoke is coupled to the valve body. Owing to the above configuration, support rigidity of the guide tube for the yoke, the fixed iron core, and the like is improved. Even when external impact is applied to the yoke, the fixed iron core, and the like, the above configuration inhibits the guide tube from being damaged by the impact. As a result, the above configuration is effective in improving impact resistance of the electromagnetic valve. Besides, the cylindrical protruding portion that includes a flow path formed therethrough in the axial direction thereof is formed on the valve body in a protruding manner, and the abutment portion that includes the contact surface perpendicular to the axial direction of the protruding portion. Owing to a configuration in which the valve body is attached to the attachment body using the protruding portion and the abutment portion, the protruding portion can be inhibited from being damaged when external impact is applied thereto. As a result, impact resistance of the electromagnetic valve can be improved.

The electromagnetic valve of the present invention is configured such that the one opening end side of the cylindrical guide tube, into which the movable iron core is movably inserted, is coupled to the valve body, and the fixed iron core is inserted from the other opening end side of the guide tube. The movable iron core and the fixed iron core are thus faced with each other. Further, the fixed iron core is coupled to the yoke, and the yoke is coupled to the valve body. Still further, the cylindrical protruding portion is formed on the valve body in a protruding manner, and the abutment portion that includes the contact surface perpendicular to the axial direction of the protruding portion. The valve body is attached to the attachment body using the protruding portion and the abutment portion. Owing to such a configuration, support rigidity of the guide tube for the yoke, the fixed iron core, and the like is improved, and the protruding portion can be inhibited from being damaged when external impact is applied thereto. As a result, the above configuration is effective in improving impact resistance of the electromagnetic valve. Moreover, the fixed iron core is inserted from the other opening end side of the guide tube with a clearance spaced from the inside of the guide tube. Even when external impact is applied to the yoke, the fixed iron core, and the like, such a configuration inhibits the guide tube from being damaged by the impact. As a result, impact resistance of the electromagnetic valve can be improved.

The first valve body member is made of austenitic stainless steel, which is more excellent in hydrogen embrittlement resistance and has higher mechanical strength than magnetic material. That enables the first valve body member to secure impact resistance. Besides, by making the second valve body member of magnetic material, magnetic efficiency of the magnetic circuit can be improved.

EXPLANATION OF REFERENCE NUMERALS

| 1 | gas tank | 8 | attachment body |
|---|---|---|---|
| 21 | electromagnetic valve | 22 | valve body |
| 24 | first valve body member | | |
| 26 | second valve body member | | |
| 28 | protruding portion | 33 | contact surface |
| 34 | abutment portion | 36 | communication hole |
| 44 | connection hole | 46 | valve seat |
| 48 | valve seat member | 54 | valve element |
| 60 | valve seat | 62 | guide tube |
| 64 | movable iron core | | |
| 65 | valve element portion | | |
| 70 | coil | 74 | fixed iron core |
| 76 | clearance | 78 | yoke |
| 86 | cap member | 104 | flow path |

BEST MODE FOR CARRYING OUT THE INVENTION

Figure 1:
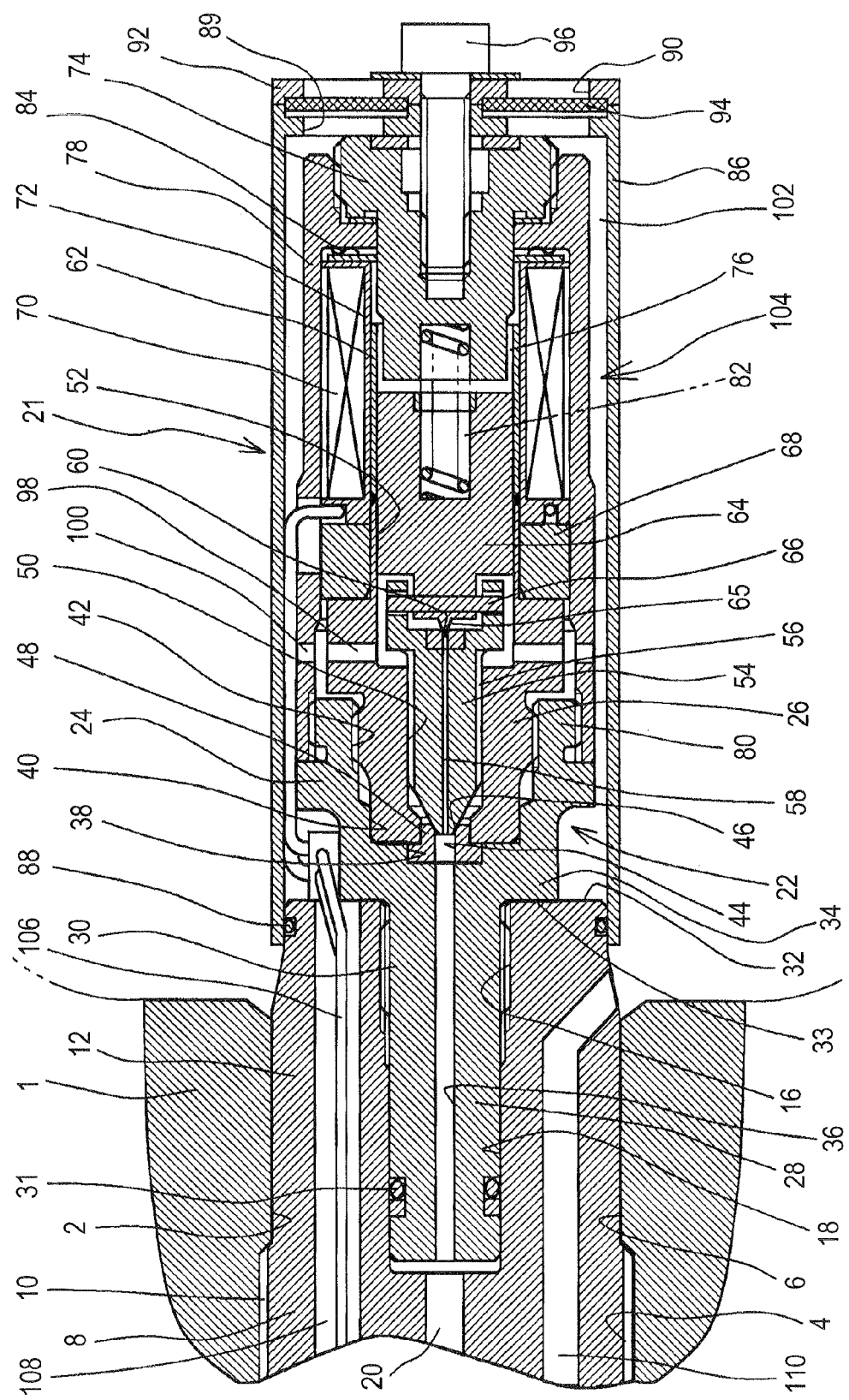
FIG. 1 is an axial sectional view showing a valve-closed state of an electromagnetic valve attached to a gas tank as one embodiment of the present invention.

The best mode for carrying out the invention will be explained in detail hereinafter with reference to the drawings. As shown in FIG. 1, numeral 1 represents a gas tank into which high-pressure hydrogen gas is charged in the present embodiment. The gas tank 1 includes a mouth hole 2 formed in a through manner such that the mouth hole 2 communicates between an inside and an outside of the gas tank 1. The mouth hole 2 is provided with a female screw portion 4 and a straight hole portion 6 formed continuously to the female screw portion 4.

An attachment body 8 is inserted into the mouth hole 2 from the outside of the gas tank 1 to the inside thereof. The attachment body 8 has a male screw portion 10 and a straight shaft portion 12. The male screw portion 10 is to be screwed into the female screw portion 4 and the straight shaft portion 12 is to be fitted into the straight hole portion 6.

The attachment body 8 is formed to have a length sufficient to allow a leading end thereof to reach the inside of the gas tank 1. Inside the attachment body 8, a screw hole 16 and an insertion hole 18 provided continuously to the screw hole 16 are formed in an axial direction from an end of the attachment body 8 on an inside side of the gas tank 1. A through hole 20 is further formed continuously to the insertion hole 18. An electromagnetic valve 21 is attached to the attachment body 8 on the leading end side thereof inside the gas tank 1.

The electromagnetic valve 21 includes a valve body 22 that has a first valve body member 24 made of austenitic stainless steel (JIS SUS316L) and a second valve body member 26 made of magnetic material. The first valve body member 24 has a cylindrical protruding portion 28 formed in a protruding manner. The protruding portion 28 is fitted into the insertion hole 18 of the attachment body 8, and a screw shaft portion 30 formed on the protruding portion 28 is screwed into the screw hole 16, whereby the electromagnetic valve 21 is fixed to the attachment body 8. An O-ring 31 is mounted around the protruding portion 28 to inhibit leakage.

The attachment body 8 has a flat surface 32 formed on the end thereof inside the gas tank 1. The flat surface 32 is perpendicular to a longitudinal direction of the insertion hole 18. The first valve body member 24 includes an abutment portion 34 having a contact surface 33 that is in contact with the flat surface 32. In the present embodiment, the contact surface 33 is formed as a flat surface perpendicular to an axial direction of the protruding portion 28. The contact surface 33 is not limited to be formed as a flat surface, but may be formed by three or more projection tips.

The protruding portion 28 includes a communication hole 36 formed in an axial direction thereof, which is communicated with the through hole 20. The first valve body member 24 has a small diameter hole 38, a large diameter hole 40, and a screw hole 42 formed continuously to the communication hole 36 in this order toward the inside of the gas tank 1. A valve seat member 48 is inserted into the small diameter hole 38. The valve seat member 48 has a connection hole 44 formed therethrough in communication with the communication hole 36, and a valve seat 46 formed thereon.

The second valve body member 26 is inserted into the large diameter hole 40 and also screwed into the screw hole 42. The second valve body member 26 has a slide hole 50 formed in an axial direction thereof, and an insertion hole 52 formed continuously to the slide hole 50 in this order toward the inside of the gas tank 1.

Figure 2:
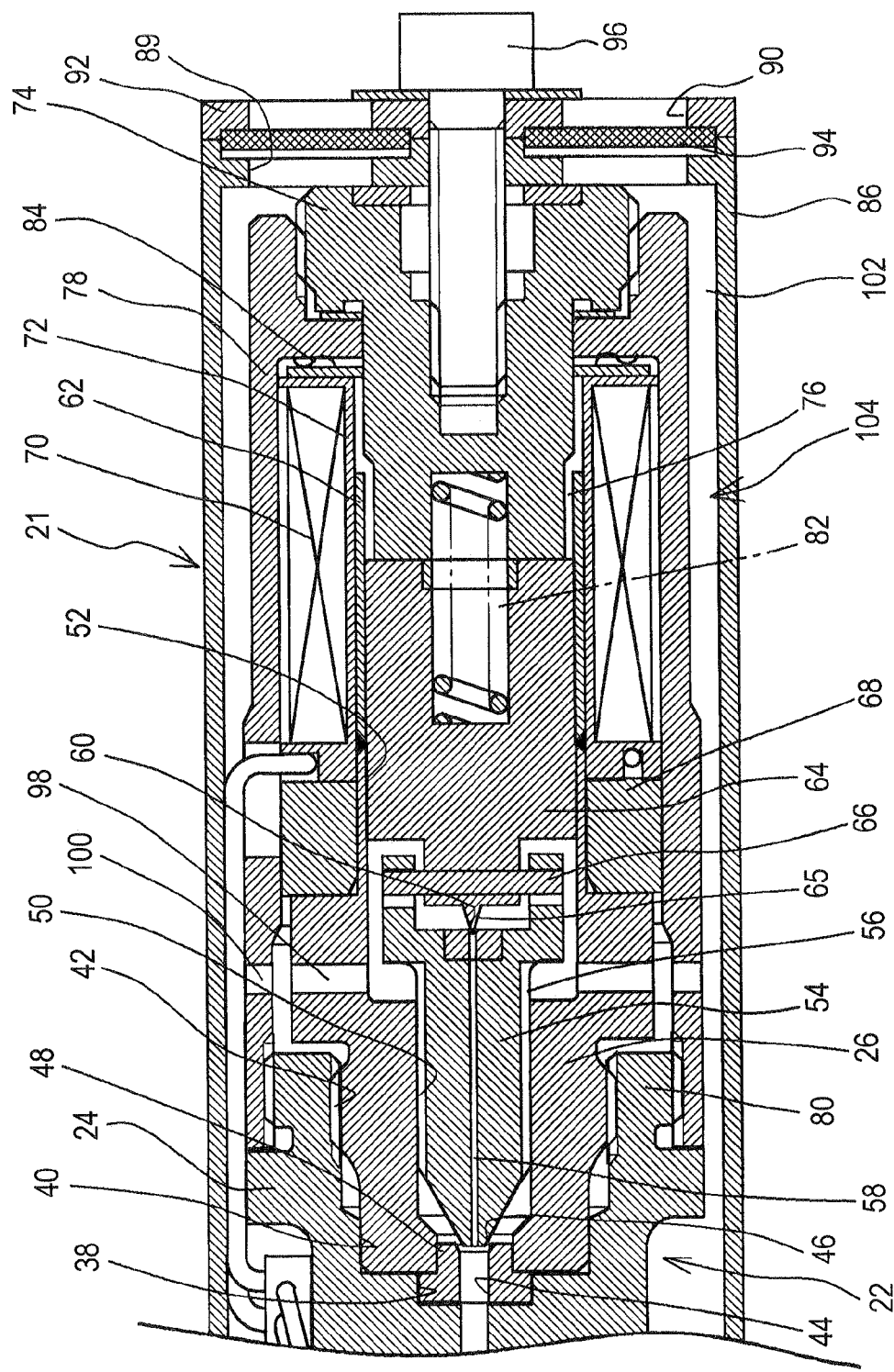
FIG. 2 is a main-part-enlarged sectional view showing a valve-opened state of the electromagnetic valve of the present embodiment.

As shown in FIG. 2, a valve element 54 is axially movably inserted into the slide hole 50, and on an outer periphery of the valve element 54, a plurality of grooves 56 are formed along an axial direction thereof. The valve element 54 is configured to be able to be seated on and separated from the valve seat 46 by moving inside the slide hole 50. In a middle of the valve element 54, a small diameter hole 58 is formed in a through manner, and the small diameter hole 58 is communicated with the insertion hole 52 via a valve seat 60.

A guide tube 62 made of nonmagnetic material such as austenitic stainless steel is coupled to the second valve body member 26. The guide tube 62 is cylindrical and an inside diameter thereof is formed to be approximately equivalent to that of the insertion hole 52. One opening end side of the guide tube 62 is coupled by welding to the second valve body member 26 coaxially with the insertion hole 52, whereby an inside of the guide tube 62 is communicated with the insertion hole 52.

A movable iron core 64 is axially movably inserted into the insertion hole 52 and the guide tube 62, and a leading end of the movable iron core 64 is inserted into the valve element 54 with a clearance spaced therebetween. On the leading end of the movable iron core 64, a valve element portion 65 is formed, which is seated on the valve seat 60 to block communication between the small diameter hole 58 and the insertion hole 52.

The movable iron core 64 and the valve element 54 are engaged by a radially-inserted pin 66. The pin 66 is fitted into the movable iron core 64 with no clearance therebetween, whereas a clearance is formed between the valve element 54 and the pin 66.

On an outer periphery of the second valve body member 26, an annular member 68 made of magnetic material is mounted, and on an outer periphery of the guide tube 62, a coil 70 is mounted. The coil 70 is a known one obtained by winding an electric wire around a bobbin 72.

A fixed iron core 74 is inserted into the guide tube 62 from an other opening end side thereof. The fixed iron core 74 is inserted with a clearance 76 spaced between an outer periphery of the fixed iron core 74 and an inner periphery of the guide tube 62. The movable iron core 64 and the fixed iron core 74 are configured to face each other.

A closed-end tubular yoke 78 is provided over an outside of the coil 70. The fixed iron core 74 is inserted into the guide tube 62 through a bottom wall of the yoke 78 and coupled to the yoke 78 by being screwed thereto. Further, the yoke 78 is coupled to a male screw portion 80 of the first valve body member 24 by being screwed thereto.

A coil spring 82 is arranged between the movable iron core 64 and the fixed iron core 74. Biasing force of the coil spring 82 biases the movable iron core 64 in a direction where the movable iron core 64 is moved to be seated on the valve seat 60. A wave-shaped washer 84 is interposed between the bobbin 72 and the yoke 78.

An end portion of the attachment body 8 that protrudes inside the gas tank 1 is covered with a cap member 86. At an end portion of the cap member 86, leakage is to be inhibited by an O-ring 88 mounted around the attachment body 8. The cap member 86 is mounted on an outer periphery of the attachment body 8 in such a manner that an outside diameter of the attachment body 8 is reduced so that an outside diameter of the cap member 86 becomes equal to or less than that of the straight shaft portion 12 of the attachment body 8.

At an axial end of the cap member 86, a plurality of openings 89 are provided. And a disk-shaped pressing member 92 having openings 90 formed coaxially with the openings 89 is disposed at the end of the cap member 86. A flat plate-like filter member 94 is sandwiched between the end of the cap member 86 and the pressing member 92.

A bolt 96 that penetrates the cap member 86, the pressing member 92, and the filter member 94 is screwed into the fixed iron core 74, whereby the cap member 86, the pressing member 92, and the filter member 94 are fixed to the fixed iron core 74. The filter member 94 can capture foreign substances mixed into high-pressure gas charged into the gas tank 1.

The second valve body member 26 has a plurality of connection holes 98 provided therethrough, which are perpendicular to an axial direction of the second valve body member 26 and communicated with the insertion hole 52. The yoke 78 has through holes 100 provided coaxially with the connection holes 98. A clearance is spaced between an outer periphery of the yoke 78 and an inner periphery of the cap member 86 to form a path 102, which is communicated with the openings 89.

The through hole 20, the communication hole 36, the connection hole 44, the slide hole 50, the insertion hole 52, the connection hole 98, the through hole 100, the path 102, and the openings 89 and 90 form a flow path 104, which communicates the outside and the inside of the gas tank 1.

A lead wire 106 connected to the coil 70 passes between the outer periphery of the yoke 78 and the inner periphery of the cap member 86, and is pulled out of the gas tank 1 through a pass-through hole 108 formed through the attachment body 8. The lead wire 106 is configured to be able to be connected to a not-shown external power source disposed outside of the gas tank 1. The pass-through hole 108 is blocked by a not-shown stop valve or the like.

The attachment body 8 has a supply hole 110 formed therethrough, which is configured to open on a side surface of the attachment body 8 inside the gas tank 1 to enable high-pressure gas to be charged into the gas tank 1.

Next, operation of the above-described electromagnetic valve of the present embodiment will be explained.

High-pressure hydrogen gas is initially charged into the gas tank 1 through the supply hole 110. When a car is driven, the coil 70 connected to the external power source is energized via the lead wire 106. Such energization excites the fixed iron core 74 to attract the movable iron core 64 thereto. Thus, a magnetic circuit is formed through the fixed iron core 74, the yoke 78, the annular member 68, the second valve body member 26, and the movable iron core 64.

As shown in FIG. 2, when the movable iron core 64 is moved inside the insertion hole 52 and the guide tube 62, the valve element portion 65 on the leading end of the movable iron core 64 is separated from the valve seat 60. The high-pressure hydrogen gas thereby flows into the connection hole 44 through the openings 90, the filter member 94, the openings 89, the path 102, the through hole 100, the connection hole 98, the insertion hole 52, and the small diameter hole 58.

With increase in pressure inside the connection hole 44, the movable iron core 64 is further moved to move the valve element 54 via the pin 66, whereby the valve element 54 is separated from the valve seat 46. Therefore, the slide hole 50 and the connection hole 44 are communicated with each other via the valve seat 46. As a result, the openings 90, the filter member 94, the openings 89, the path 102, the through hole 100, the connection hole 98, the insertion hole 52, the grooves 56, the slide hole 50, the connection hole 44, the communication hole 36, and the through hole 20 are communicated with one another, whereby the high-pressure hydrogen gas flows out of the gas tank 1.

On the other hand, when the coil 70 is de-energized, the attraction for the movable iron core 64 by the fixed iron core 74 is terminated. The movable iron core 64 is moved inside the insertion hole 52 and the guide tube 62 by the biasing force of the coil spring 82, and the valve element body 65 on the leading end of the movable iron core 64 is thereby seated on the valve seat 60. The movable iron core 64 also pushes the valve element 54 to cause the valve element 54 to be seated on the valve seat 46. Accordingly, as shown in FIG. 1, the communication among the connection hole 44, the slide hole 50, and the small diameter hole 58 is blocked to halt the high-pressure hydrogen gas from flowing out.

In a case where an external force such as an impact is applied to the fixed iron core 74 and the yoke 78 from any cause, the external force is transmitted to the first valve body member 24 via the fixed iron core 74 and the yoke 78. Since one end of the yoke 78 is coupled to a first valve body member 24 and the fixed iron core 74 is coupled to an other end of the yoke 78, support rigidity of the yoke 78 and the fixed iron core 74 is high. Therefore, even when impact load is applied to the yoke 78 and the fixed iron core 74, vibration of the yoke 78 and the fixed iron core 74 has a small amplitude. Particularly, in the present embodiment, the yoke 78 has a high rigidity because of its cylindrical shape.

In addition, the clearance 76 is provided between the guide tube 62, one end of which is coupled to the second valve body member 26, and the fixed iron core 74. Consequently, even when a relative displacement between the fixed iron core 74 and the guide tube 62 occurs, damage of the guide tube 62 caused by collision of the fixed iron core 74 against the inner periphery of the guide tube 62 can be inhibited. As a result, impact resistance of the guide tube 62 can be improved.

As in the present embodiment, in a case where the one end of the guide tube 62 is coupled to the second valve body member 26 by welding, a welded portion becomes poor in impact resistance due to hydrogen embrittlement when the nonmagnetic guide tube 62 is formed of austenitic stainless steel and the magnetic second valve body member 26 is formed of ferritic stainless steel.

By coupling the yoke 78 to the first valve body member 24 and providing the clearance 76 between the guide tube 62 and the fixed iron core 74, impact resistance can be improved because impact load from outside can be inhibited from being applied to the welded portion of the guide tube 62. A dimension of the clearance 76 may be determined in accordance with experimental results and the like.

As described above, since the one end of the yoke 78 is coupled to the first valve body member 24 and the fixed iron core 74 is coupled to the other end of the yoke 78, support rigidity of the yoke 78 and the fixed iron core 74 is high. Moreover, when the protruding portion 28 of the first valve body member 24 is inserted into the insertion hole 18, the screw shaft portion 30 is screwed into the screw hole 16 to bring the abutment portion 34 into intimate contact with the flat surface 32. As a result, the first valve body member 24 is firmly fixed to the attachment body 8. Even when impact load caused by external force or the like is transmitted to the first valve body member 24, a large moment or shear force is inhibited from being applied to a base of the protruding portion 28 because the abutment portion 34 is in intimate contact with the flat surface 32. Damage or the like of the protruding portion 28 can be thereby inhibited, and improved impact resistance thereof can be obtained.

Further, in the present embodiment, the valve body 22 includes the first valve body member 24 made of austenitic stainless steel and the second valve body member 26 made of magnetic material, and is configured as follows: the first valve body member 24 has the protruding portion 28 and the abutment portion 34 formed thereon; the yoke 78 is coupled to the first valve body member 24; and a part of the magnetic circuit is formed through the second valve body member 26. The first valve body member 24 is required to have mechanical strength because the first valve body member 24 is to be attached to the attachment body 8 and coupled to the yoke 78. Therefore, the first valve body member 24 may secure impact resistance by being formed of austenitic stainless steel having more excellent resistance to hydrogen embrittlement and higher mechanical strength than magnetic material. Since the second valve body member 26 is formed of magnetic material, magnetic efficiency of the magnetic circuit can be improved.

In the present embodiment, the electromagnetic valve is configured as a pilot type valve, which has the valve element 54 and the movable iron core 64 formed separately. However, an electromagnetic valve in which the valve element 54 and the movable iron core 64 are integrally configured can be also practiced.

It is to be understood that the present invention should not be limited to the above-described embodiments, but may be practiced in various forms without departing from the spirit of the invention.

The invention claimed is:

1. An electromagnetic valve, comprising:
a valve body that includes a fluid flow path;
a valve element that is movable and seated on a valve seat provided in the fluid flow path of the valve body;
a movable iron core that moves the valve element with respect to the valve seat;
a guide tube that is cylindrical and movably supports the movable iron core;
a coil that is mounted on an outer periphery of the guide tube;
a yoke that covers an outside of the coil and forms a magnetic circuit; and
a fixed iron core that is provided facing the movable iron core and attracts the movable iron core by energization of the coil, wherein the valve body is coupled to the guide tube on one opening end side of the guide tube, and the fixed iron core is provided on another end side of the guide tube with a clearance between a part of an outside surface of the fixed iron core and an inside surface of the guide tube, the part of the outside surface of the fixed iron core being different from a surface of the fixed iron core which faces the moveable iron core, and wherein one end of the yoke is coupled to the fixed iron core, and the valve body is coupled to another end of the yoke.

2. The electromagnetic valve according to claim 1, wherein the valve body includes a protruding portion that is cylindrical and provided in a protruding manner from the valve body, the protruding portion including the fluid flow path formed therethrough in an axial direction thereof, and wherein an abutment portion is provided on the valve body, the abutment portion having a contact surface extending in a direction perpendicular to the axial direction of the protruding portion and abutting against an attachment portion used to attach the electromagnetic valve thereto.

3. The electromagnetic valve according to claim 2, wherein the valve body includes a first valve body member made of austenitic stainless steel and a second valve body member made of magnetic material, wherein the first valve body member includes the protruding portion and the abutment portion, and is coupled to the yoke, and wherein the second valve body member forms a part of the magnetic circuit.

4. An electromagnetic valve for use in a gas tank, comprising:
 a valve body that includes a gas flow path;
 a valve element that is movable and seated on a valve seat provided in the gas flow path;
 a movable iron core that moves the valve element with respect to the valve seat;
 a guide tube that is cylindrical and movably supports the movable iron core;
 a coil that is mounted on an outer periphery of the guide tube;
 a yoke that covers an outside of the coil and forms a magnetic circuit; and
 a fixed iron core that attracts the movable iron core by energization of the coil,
 wherein the valve body is coupled to the guide tube on one opening end side of the guide tube, and the fixed iron core is provided on another end side of the guide tube with a clearance between a part of an outside surface of the fixed iron core and an inside surface of the guide tube, the part of the outside surface of the fixed iron core being different from a surface of the fixed iron core which faces the movable iron core,
 wherein the fixed iron core is coupled to one end of the yoke, and the valve body is coupled to another end of the yoke,
 wherein the valve body includes a protruding portion that is cylindrical and provided in a protruding manner from the valve body, the protruding portion including the gas flow path formed therethrough in an axial direction thereof, and
 wherein an abutment portion is provided on the valve body, the abutment portion having a contact surface extending in a direction perpendicular to the axial direction of the protruding portion and abutting against an attachment portion used to attach the electromagnetic valve to a gas tank.

5. The electromagnetic valve for use in a gas tank according to claim 4, wherein the valve body includes a first valve body member made of austenitic stainless steel and a second valve body member made of magnetic material, wherein the first valve body member includes the protruding portion and the abutment portion, and is coupled to the yoke, and wherein the second valve body member forms a part of the magnetic circuit.

* * * * *